(12) United States Patent
Yamaguchi et al.

(10) Patent No.: US 8,800,619 B2
(45) Date of Patent: Aug. 12, 2014

(54) TIRE

(75) Inventors: Suguru Yamaguchi, Kawasaki (JP); Michiharu Hayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 639 days.

(21) Appl. No.: 13/123,164

(22) PCT Filed: Oct. 8, 2009

(86) PCT No.: PCT/JP2009/067578
§ 371 (c)(1),
(2), (4) Date: Apr. 7, 2011

(87) PCT Pub. No.: WO2010/041720
PCT Pub. Date: Apr. 15, 2010

(65) Prior Publication Data
US 2011/0192516 A1   Aug. 11, 2011

(30) Foreign Application Priority Data

Oct. 8, 2008   (JP) .................................. 2008-261732

(51) Int. Cl.
*B60C 11/13* (2006.01)
(52) U.S. Cl.
USPC ................. 152/209.24; 152/209.18; 152/900; 152/901
(58) Field of Classification Search
CPC   B60C 11/13; B60C 11/1307; B60C 11/1315; B60C 11/1323; B60C 11/1353; B60C 2011/0339; B60C 2011/0341
USPC .......... 152/209.24, 209.18, 900, 901
See application file for complete search history.

(56) References Cited

U.S. PATENT DOCUMENTS

| 3,556,191 A | 1/1971 | Mills |
| 2010/0096053 A1* | 4/2010 | Nagai ........................ 152/209.9 |

FOREIGN PATENT DOCUMENTS

| JP | 60-193704 A | 10/1985 |
| JP | 2002-019422 A | 1/2002 |
| JP | 2007-001434 A | 1/2007 |
| JP | 2007-314029 A | 12/2007 |
| WO | WO 2008/099677 * | 8/2008 |
| WO | 2008/114668 A1 | 9/2008 |

OTHER PUBLICATIONS

Chinese Office Action issued in Chinese Application No. 200980145265.8 dated Nov. 5, 2012.

(Continued)

*Primary Examiner* — Eric Hug
(74) *Attorney, Agent, or Firm* — Sughrue Mion, PLLC

(57) ABSTRACT

The present invention provides a tire in which generation of partial wear and groove cracks are suppressed. Specifically, the present invention provides a tire having in a tread surface thereof plural circumferential grooves extending in the tire circumferential direction, characterized in that: each of respective circumferential grooves disposed on the outermost side in the tire widthwise direction is designed to have a section in the tire widthwise direction, in which an angle formed by a groove wall on the outer side in the tire widthwise direction, with respect to a straight line tangent to a tread contour at the opening edge on the outer side in the tire widthwise direction of said groove, is larger than an angle formed by a groove wall on the tire equatorial side in the tire widthwise direction, with respect to a straight line tangent to a tread contour at the opening edge on the tire equatorial side in the tire widthwise direction of said groove; and each of said angles is in the range of 90° to 100° (inclusive of 90° and exclusive of 100°).

5 Claims, 5 Drawing Sheets

(56) References Cited

OTHER PUBLICATIONS

Extended European Search Report issued in European Application No. 09819254.5 dated May 4, 2012.

International Search Report for International Application No. PCT/JP2009/067578 dated Nov. 2, 2009.

Japanese Office Action, dated Jul. 30, 2013, issued in corresponding Japanese Patent Application No. 2010-532963.

* cited by examiner

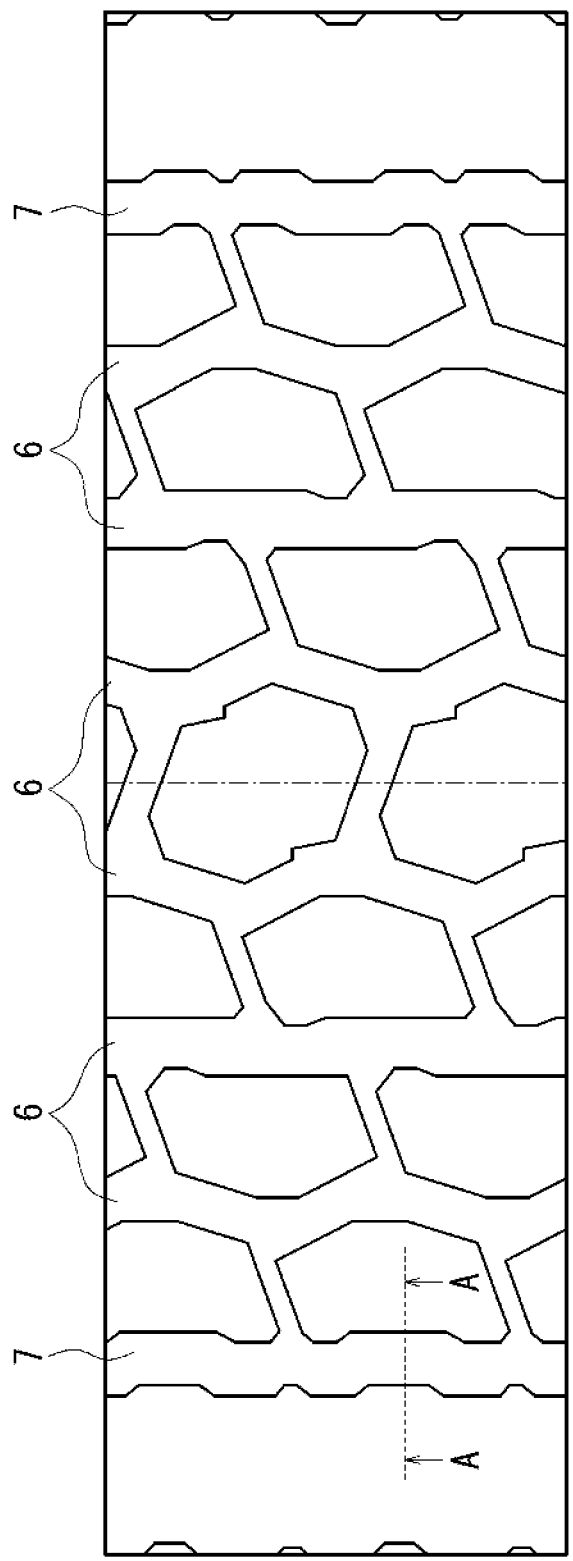

TIRE

CROSS REFERENCE TO RELATED APPLICATIONS

This application is a National Stage of International Application No. PCT/JP2009/067578 filed Oct. 8, 2009, which claims priority from Japanese Patent Application No. 2008-261732 filed Oct. 8, 2008, the contents of all of which are incorporated herein by reference in their entirety.

TECHNICAL FIELD

The present invention relates to a tire, in particular, a tire in which generation of partial wear and groove cracks are suppressed.

PRIOR ART

There are various types of partial wear generated in a tire in use. Examples of partial wear which tends to occur in a tire having in tread thereof plural circumferential grooves extending in the tire circumferential direction include early wear in a shoulder portion of the tire (shoulder-portion wear). As a countermeasure against such wear as described above, there has been known to form in a rib in each shoulder portion a groove extending in the tire circumferential direction to block growth of wear in the shoulder portion (JP 2002-019422 Laid-Open).

The tire of JP 2002-019422 exhibits some effect of enhancing wear resistance at a shoulder rib. However, there is a demand for a tire in which tire durability such as wear resistance is further improved.

DISCLOSURE OF THE INVENTION

Problems to be Solved by the Invention

In view of this, an object of the present invention is to provide a tire in which generation of partial wear and groove cracks are suppressed.

Means for Solving the Problem

The inventors of the present invention discovered, as a result of a keen study to achieve the aforementioned object, that a tire in which generation of partial wear and groove cracks are suppressed can be provided by designing a tire having in a tread surface thereof plural circumferential grooves extending in the tire circumferential direction such that a sectional shape in the tire widthwise direction of each of the respective circumferential grooves located closest to respective shoulder portions, of the plural circumferential grooves, has a predetermined configuration, thereby completing the invention.

Specifically, the main structure of the present invention is as follows. (1) A tire having in a tread surface thereof plural circumferential grooves extending in the tire circumferential direction, characterized in that: each of respective circumferential grooves disposed on the outermost side in the tire widthwise direction, of the circumferential grooves, is designed to have a section in the tire widthwise direction in which an angle formed by a groove wall on the outer side in the tire widthwise direction, with respect to a straight line tangent to a tread contour at the opening edge on the outer side in the tire widthwise direction of said groove, is larger than an angle formed by a groove wall on the tire equatorial side in the tire widthwise direction, with respect to a straight line tangent to a tread contour at the opening edge on the tire equatorial side in the tire widthwise direction of said groove; and each of said angles is in the range of 90° to 100° (inclusive of 90° and exclusive of 100°).

(2) The tire of (1) above, wherein each of the circumferential grooves disposed on the outermost side in the tire widthwise direction is designed to have a section in the tire widthwise direction, in which a radius of curvature at a groove wall bottom portion on the outer side in the tire widthwise direction is larger than a radius of curvature at a groove wall bottom portion on the tire equatorial side in the tire widthwise direction.

(3) The tire of (1) or (2) above, wherein each of the circumferential grooves disposed on the outermost side in the tire widthwise direction is a straight groove.

(4) The tire of any one of (1) to (3) above, wherein the number of the circumferential grooves is eight; a width of each land portion located on the outermost side in the tire widthwise direction, of land portions demarcated by said circumferential grooves and respective tread ends, is 20 to 40% of a half width of the tread; and a width of each of respective land portions adjacent to the respective land portions located on the outermost side in the tire widthwise direction, on the inner side in the tire widthwise direction thereof, is 60 to 80% of the width of each of the land portions located on the outermost side in the tire widthwise direction.

(5) The tire of any one of (1) to (4) above, wherein the groove wall on the outer side in the tire widthwise direction, of each of the circumferential grooves disposed on the outermost side in the tire widthwise direction, is a flat or curved face without any zigzag configuration.

(6) The tire of any one of (1) to (5) above, wherein each of the circumferential grooves disposed on the outermost side in the tire widthwise direction has a sectional shape in the tire widthwise direction, which is monotonously unchanged in the tire circumferential direction.

Effect of the Invention

According to the present invention, it is possible to provide a tire in which generation of partial wear is suppressed by reducing wear in a shoulder portion of the tire and generation of groove cracks is suppressed by decreasing a magnitude of groove opening (a groove-opening magnitude) due to exertion of load on a tread surface from a road surface.

BRIEF DESCRIPTION OF THE DRAWINGS

FIG. 5 is a development view of one example of tread of the conventional tire.

BEST MODE FOR CARRYING OUT THE INVENTION

Figure 1:
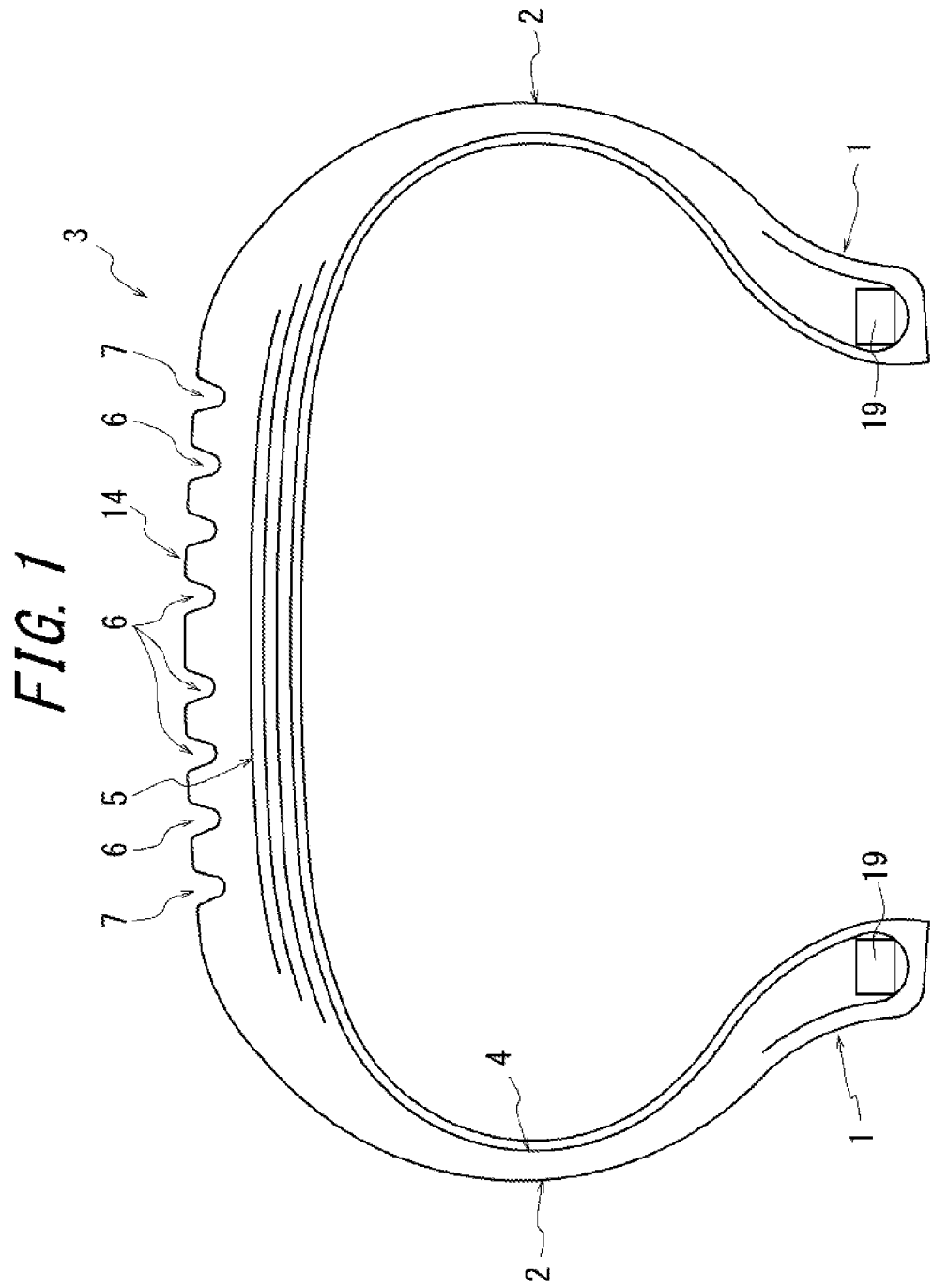
FIG. 1 is a sectional view of one example of a tire according to the present invention.
Figure 2:
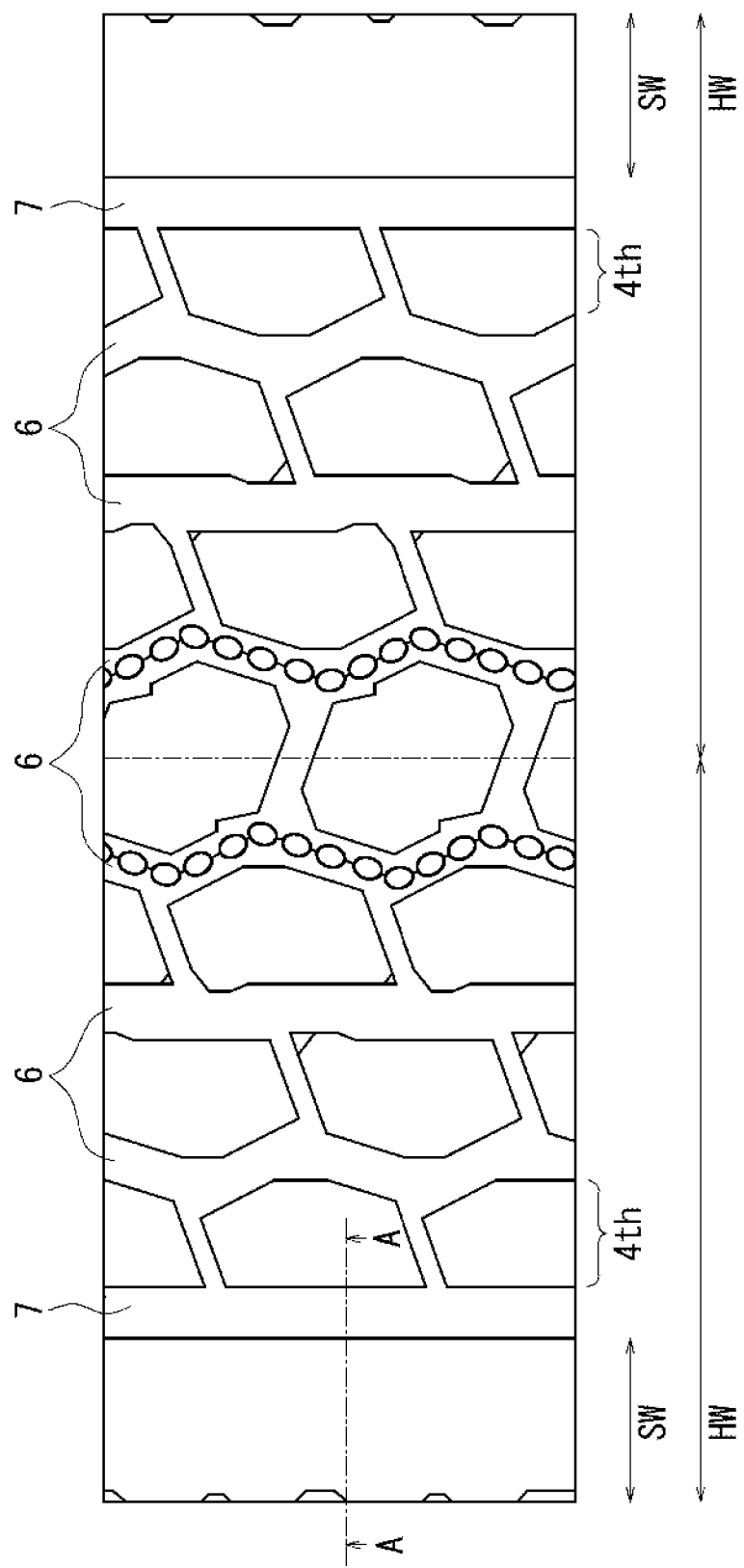
FIG. 2 is a development view of one example of tread of the tire according to the present invention.
Figure 3:
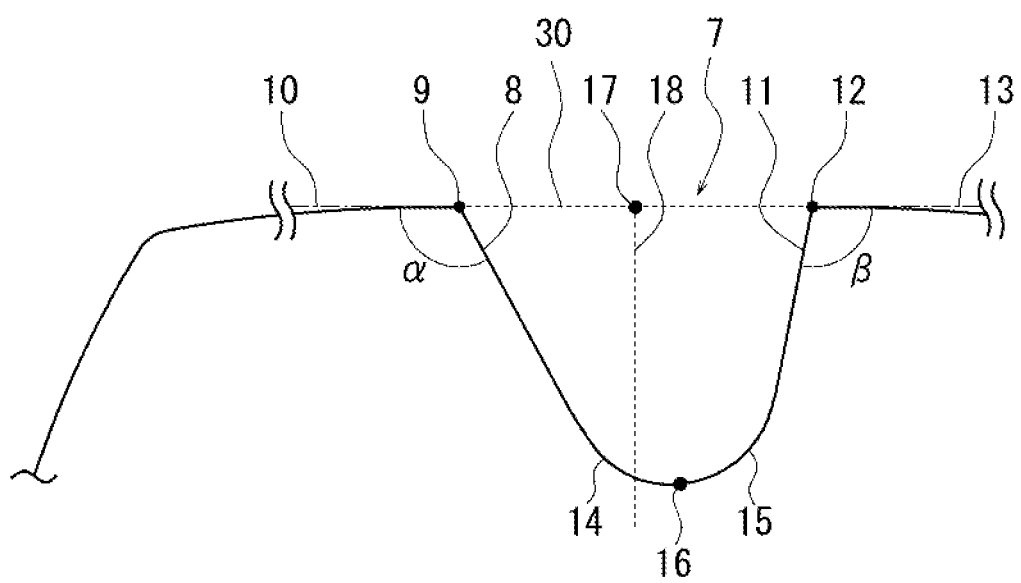
FIG. 3 is an enlarged partial sectional view of one example of the tire according to the present invention.

Hereinafter, the present invention will be described in detail with reference to the drawings. FIG. 1 is a sectional view in the tire widthwise direction of one example of a tire according to the present invention. FIG. 2 is a development view of one example of tread of the tire according to the present invention. FIG. 3 is an enlarged partial sectional view of one example of the tire according to the present invention.

As shown in FIG. 1, in one example of a tire according to the present invention, the tire has a pair of bead portions 1, a pair of sidewall portions 2, a tread portion 3 provided continuous with the respective sidewall portions, a carcass 4 extending in a toroidal shape across the pair of bead portions 1 for reinforcing the respective portions, and a belt 5 provided on the outer peripheral side of the carcass, for reinforcing the tread portion 3. The tire further includes at a surface of the tread 3 plural circumferential grooves 6 and circumferential grooves 7 disposed on the respective outermost sides in the tire widthwise direction (i.e. shoulder grooves), as shown in FIG. 2.

Each of the shoulder grooves 7 is characteristically designed to have a sectional view as shown in FIG. 3 (a sectional view cut along line A-A in FIG. 2), in which an angle α formed by a groove wall 8 on the outer side in the tire widthwise direction, with respect to a straight line 10 tangent to a contour 30 of a surface of the tread 3 at the opening edge 9 on the outer side in the tire widthwise direction of the shoulder or circumferential groove 7, is larger than an angle β formed by a groove wall 11 on the tire equatorial side in the tire widthwise direction, with respect to a straight line 13 tangent to a contour 30 of the surface of the tread 3 at the opening edge 12 on the tire equatorial side in the tire widthwise direction of the shoulder or circumferential groove 7; and each of the angles α, β is in the range of 90° to 100° (inclusive of 90° and exclusive of 100°).

In a case where at least one of the groove wall 8 and the groove wall 11 defining the angles α, β has a curved face instead of a flat face, a straight line tangent to the curved face at the ⅓ depth point of the groove depth measured from the opening edge of the shoulder groove 7 is regarded as the groove wall 8 or the groove wall 11, so that the angle α is defined between the groove wall 8 thus determined and the straight line 10 and the angle β is defined between the groove wall 11 thus determined and the straight line 13, respectively.

Figure 4:
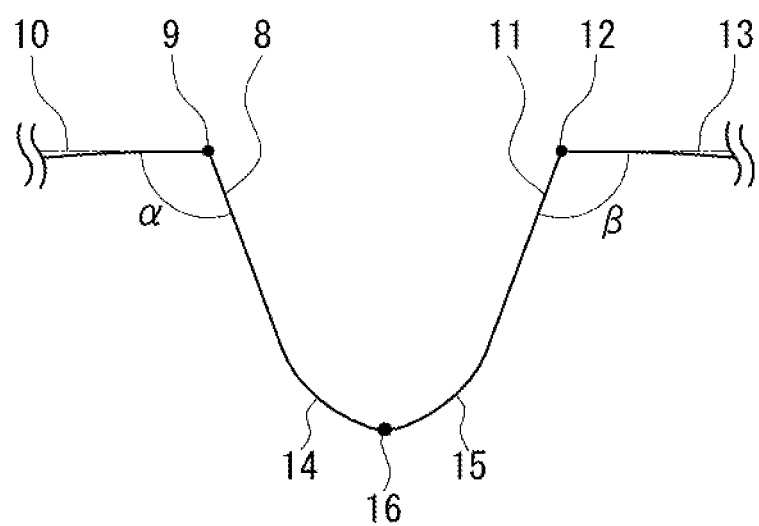
FIG. 4 is an enlarged partial sectional view of one example of the conventional tire.

In a shoulder groove of the conventional tire, as shown in FIG. 4, the angle α formed by a groove wall 8 on the outer side in the tire widthwise direction, with respect to a straight line 10 tangent to a contour 30 of the tread 3 at the opening edge 9 on the outer side in the tire widthwise direction of the shoulder or circumferential groove, is equal to the angle β formed by a groove wall 11 on the tire equatorial side in the tire widthwise direction, with respect to a straight line 13 tangent to a contour 30 of the tread 3 at the opening edge 12 on the tire equatorial side in the tire widthwise direction of the shoulder or circumferential groove. Further, each of the angles α, β is equal to or larger than 100°. Therefore, in a case where a vehicle having the aforementioned conventional tire mounted thereon is driven, shoulder portions of the tire is likely to be worn at a relatively early stage.

In the tire of the present invention, rigidity in the vicinity of the opening edge 9 on the outer side in the tire widthwise direction where wear is relatively severe increases, while rigidity in the vicinity of the opening edge 12 on the tire equatorial side in the tire widthwise direction where wear is not as severe as the vicinity of the opening edge 9 decreases lower than the rigidity in the vicinity of the opening edge 9, by setting the angle α larger than the angle β. As a result, partial wear which tends to occur in the vicinity on the outer side in the tire widthwise direction of the tread can be alleviated. In contrast, when each of the angles α, β is equal to or larger than 100°, the rigidity in the vicinity of the opening edge decreases and partial wear is likely to occur.

The number of the circumferential grooves and the structure of tire widthwise grooves in the present invention are not particularly restricted and may be appropriately selected, although a tread pattern of the tire shown in FIG. 2 is constituted of six tire circumferential grooves, two shoulder grooves and tire widthwise grooves connecting the circumferential grooves.

In the conventional tire having a groove of which sectional shape in the tire widthwise direction is symmetric as shown in FIG. 4, external forces concentrate on a groove bottom portion 14 adjacent to the groove wall on the outer side in the tire widthwise direction and the groove opening magnitude of the shoulder groove increases, whereby there arises a problem that groove cracks tend to be generated in the groove bottom portion 14. In the tire of the present invention, it is essential to set the angle α larger than the angle β and each of the angles α, β is in the range of 90° to 100° (inclusive of 90° and exclusive of 100°) in order to solve this problem.

In the present embodiment, the groove wall 8 on the outer side in the tire widthwise direction of the shoulder groove 7 is preferably constituted of a flat or curved face without any zigzag configuration because, if the groove wall 8 has any zigzag portion, stress concentrates on the zigzag portion when the tread is brought into contact with the ground and cracks may be generated. This requirement on the groove wall 8 is applied to the groove wall 11 on the tire equatorial side, as well.

It is preferable that a sectional shape in the tire widthwise direction of the shoulder groove 7 is monotonously unchanged in the tire circumferential direction. In a case where a sectional shape in the tire widthwise direction of the shoulder groove 7 changes in the tire circumferential direction, a groove volume decreases in some portions of the shoulder groove 7 and tire performance on wet roads may deteriorate. In a case where the shoulder groove 7 extends in a zigzag shape in the circumferential direction, in particular, stress tends to concentrate on the acute-angle portions of the groove and cracks may be generated therein. In order to avoid such a situation as described above, it is advantageous to design a sectional shape in the tire widthwise direction of the shoulder groove to be monotonously unchanged in the tire circumferential direction.

Further, in the tire of the present invention, each of the circumferential grooves disposed on the outermost side in the tire widthwise direction is designed to have a section in the tire widthwise direction, in which a radius of curvature at a groove wall bottom portion 14 adjacent to the deepest portion 16 of the groove bottom on the outer side in the tire widthwise direction is larger than a radius of curvature at a groove wall bottom portion 15 adjacent to the deepest portion 16 of the groove bottom on the tire equatorial side in the tire widthwise direction, as shown in FIG. 3. External forces which tend to concentrate on the groove wall bottom portion 14 can be dispersed by designing the groove bottom of the shoulder groove to have such a structure as described above and generation of groove cracks which tend to occur in such a portion as the groove wall bottom portion 14 can be advantageously suppressed by reducing the groove opening magnitude of the shoulder groove.

The ranges of the groove wall bottom portions 14, 15 are not particularly restricted and may be appropriately selected, as long as the groove wall bottom portions satisfying the aforementioned requirement regarding the radii of curvature thereof exist adjacent to the deepest portion 16 of the groove bottom on the respective sides in the tire widthwise direction.

In the tire of the present invention, the radius of curvature of the groove wall bottom portion 14 on the outer side in the tire widthwise direction is preferably in the range of 5 to 10 mm and the radius of curvature of the groove wall bottom portion 15 on the tire equatorial side in the tire widthwise direction is preferably in the range of 2 to 5 mm in terms of suppressing generation of groove cracks described above. In a case where the radius of curvature of the groove wall bottom portion 14 on the outer side in the tire widthwise direction is smaller than 5 mm, stress tends to concentrate on the groove bottom and groove cracks are likely to be generated, while in a case where the same radius of curvature exceeds 10 mm, the groove opening magnitude of the shoulder groove is too much and stone holding is likely to occur in the tire. In a case where the radius of curvature of the groove wall bottom portion 15 on the tire equatorial side in the tire widthwise direction is smaller than 2 mm, groove cracks are likely to be generated, while in a case where the same radius of curvature exceeds 5 mm, stone holding is likely to occur in the tire.

In the tire of the present invention, when the aforementioned requirements are all satisfied, the shoulder groove 7 has a sectional shape in the tire widthwise direction, in which the deepest portion 16 of the groove bottom is positioned on the tire equatorial side with respect to a line 18 drawn from the midpoint between the opening edge 9 and the opening edge 12 to be normal to the tire rotation axis.

In the tire of the present invention, the maximum depth of the shoulder groove is preferably in the range of 17 to 25 mm. In a case where the depth of the shoulder groove is less than 17 mm, wear resistance deteriorates. In a case where the depth of the shoulder groove exceeds 25 mm, rigidity of blocks decreases and blocks may chip off. Further, the opening width of the shoulder groove is preferably in the range of 12 to 16 mm. In a case where the opening width of the shoulder groove is smaller than 12 mm, tire performance on wet roads may deteriorate. In a case where the opening width of the shoulder groove exceeds 16 mm, the magnitude of opening/closing of the groove is too much and generation of groove cracks is likely to occur.

In one example of the tire having the pair of bead portions 1, the pair of sidewall portions 2, the tread portion 3 provided continuous with the respective sidewall portions, the carcass 4 extending in a toroidal shape across the pair of bead portions 1 for reinforcing the respective portions, and the belt 5 provided on the outer peripheral side of the carcass, for reinforcing the tread portion 3, of the present invention, the belt 5 is preferably constituted of at least one layer of circumferential belt and two layers of inclined belts disposed to be inclined with respect to the circumferential direction, as shown in FIG. 1. An angle formed by each inclined belt with respect to the tire circumferential direction is preferably in the range of 30° to 80°. In the present embodiment, the belt preferably includes at least one layer of circumferential belt and two layers of inclined belts because then rigidity of the belt in the tire circumferential direction increases. In a case where the angle formed by each inclined belt with respect to the tire circumferential direction is smaller than 30°, shear deformation in the tire widthwise direction is intensified and rigidity of the belt in the tire circumferential direction decreases. In a case where the angle formed by each inclined belt with respect to the tire circumferential direction exceeds 80°, shear deformation in the tire circumferential direction is intensified and troubles are likely to occur in belt end portions.

In the conventional tire, the shoulder groove 7 is a zigzag-shaped groove as shown in FIG. 5. In a case where the shoulder groove 7 has a zigzag-shape as described above, there arises a problem that the shoulder groove becomes a main factor that causes partial wear. In order to address this problem, the shoulder groove 7 is preferably a straight groove in the tire of the present invention, as shown in FIG. 2.

The tire of the present invention preferably has eight circumferential grooves, as shown in FIG. 2, in view of achieving good drainage properties and wear resistance of the tire in a compatible manner. Further, a width SW of a shoulder rib is preferably in the range of 20 to 40% of the tread half width HW. In the present embodiment, in a case where the width SW of each shoulder rib is smaller than 20% of the tread half width HW, block rigidity of the shoulder rib decreases and the shoulder block may chip off. In a case where the width SW of each shoulder rib exceeds 40% of the tread half width HW, block rigidity of the shoulder rib increases too much and the shoulder rib tends to be a main factor that causes partial wear. Further, a width of a land portion 4th ($4^{th}$ rib) adjacent to the shoulder rib on the inner side in the tire widthwise direction is preferably in the range of 60 to 80% of the width SW of the shoulder rib. In a case where the width of the $4^{th}$ rib is smaller than 60% of the width of the shoulder rib, wear resistance of the tire deteriorates. In a case where the width of the $4^{th}$ rib exceeds 80% of the width of the shoulder rib, wet performance of the tire deteriorates.

The tire of the present invention is not particularly restricted, except that: the tire has on a surface of the tread thereof plural circumferential grooves extending in the tire circumferential direction; each of respective circumferential grooves disposed on the respective outermost sides in the tire widthwise direction, of the circumferential grooves, is designed to have a section in the tire widthwise direction, in which an angle formed by a groove wall on the outer side in the tire widthwise direction, with respect to a straight line tangent to a tread contour at the opening edge on the outer side in the tire widthwise direction of said groove, is larger than an angle formed by a groove wall on the tire equatorial side in the tire widthwise direction, with respect to a straight line tangent to a tread contour at the opening edge on the tire equatorial side in the tire widthwise direction of said groove; and each of said angles is in the range of 90° to 100° (inclusive of 90° and exclusive of 100°). The tire of the present invention can be produced by the conventional method based on the conventional tire structure.

The tire of the present invention may be either a pneumatic tire or a solid tire. In a case where the tire of the present invention is a pneumatic tire, examples of gas with which the tire is to be filled include ambient air, air having adjusted oxygen partial pressure, and inert gas such as nitrogen, argon, helium, and the like. The tire of the present invention can be suitably used as a pneumatic radial tire for heavy load.

EXAMPLES

Hereinafter, the present invention will be described further in detail by Examples below. The present invention is not limited to these Examples and may be appropriately changed within the sprit thereof.

Examples 1 to 5

A test tire was produced as a tire of Comparative Example 1, which tire is of the structure as shown in FIG. 1 and has: a belt 5 including one layer of circumferential belt and two layers of inclined belts, the two layers of the inclined belts being symmetrically inclined at 39° with respect to the tire circumferential direction, respectively; a tread pattern shown in FIG. 5; shoulder grooves 7 each having a sectional shape in the tire widthwise direction as shown in FIG. 4 (i.e. a sectional view cut along A-A line of FIG. 5), in which groove depth, groove width, radii of curvature of a groove bottom portions 14, 15 exhibit the values shown in Table 1, respectively; and tire size of 445/50R22.5. Further, other test tires were produced as tires of Comparative Example 2 and Examples 1 to 7, each of which tires is of the structure as shown in FIG. 1 and has: a belt 5 including one layer of circumferential belt and two layers of inclined belts, the two layers of the inclined belts being symmetrically inclined at 39° with respect to the tire circumferential direction, respectively; a tread pattern shown in FIG. 2; shoulder grooves 7 each having a sectional shape in the tire widthwise direction as shown in FIG. 3, in which groove depth, groove width, radii of curvature of a groove bottom portions 14, 15 exhibit the values shown in Table 1, respectively; and tire size of 445/50R22.5. Each of these pneumatic test tires was assembled with a rim having rim size: 14.00, inflated at an inner pressure of 690 kPa, subjected to load application at 3860 kg. A test for evaluating the groove opening magnitude and a partial wear test, which are indoor tests, and a vehicle fuel consumption test and a partial wear test, which are tests using an actual vehicle, were then carried out respectively according to the methods described below for the tire in the aforementioned state. The results are shown in Table 1.

(Evaluation Method for Groove Opening Magnitude Test)

Evaluation in a groove opening magnitude test is carried out by measuring a width of the shoulder groove in the tire circumferential direction and a distance between intersections of the shoulder-groove forming block edges and line A-A (i.e. the distance between the block edges 9, 12 in FIG. 3). The values of Examples are expressed by indices with respect to the value of Comp. Example 1 being 100. The smaller index value represents the better evaluation.

(Evaluation Method of Wear Energy at a Shoulder Portion)

Wear energy at a shoulder portion is evaluated by measuring shearing force at block portions of the shoulder portion in the ground-contact surface of a tire in the cases of: free rotation of the tire; rotation of the tire with driving force applied thereto; rotation of the tire with lateral force applied thereto; and rotation of the tire with a camber angle imparted thereto, respectively. The values of Examples are expressed by indices with respect to the value of Comp. Example 1 being 100. The smaller index value represents the better evaluation.

(Evaluation Method for Fuel Consumption Test)

Evaluation in a vehicle fuel consumption test is carried out by making a vehicle having each test tire mounted thereon run and measuring a fuel consumption of the vehicle. The values of Examples are expressed by indices with respect to the value of Comp. Example 1 being 100. The smaller index value represents the better evaluation.

(Evaluation Method for Partial Wear Test)

Evaluation in a partial wear test is carried out by measuring a magnitude of movement of a block within the ground-contact surface and a distribution of ground-contact pressure. The values of Examples are expressed by indices with respect to the value of Comp. Example 1 being 100. The smaller index value represents the better evaluation.

TABLE 1

| | | Comp. Ex. 1 | Comp. Ex. 2 | Comp. Ex. 3 | Example 1 | Example 2 | Example 3 | Example 4 | Example 5 |
|---|---|---|---|---|---|---|---|---|---|
| Groove depth (mm) | | 20 | 20 | 20 | 20 | 20 | 20 | 20 | 20 |
| Groove width (mm) | | 14 | 14 | 14 | 14 | 14 | 14 | 14 | 14 |
| Angle α (°) | | 102 | 98 | 100 | 98 | 98 | 98 | 98 | 98 |
| Angle β (°) | | 102 | 100 | 98 | 94 | 94 | 94 | 92 | 92 |
| Radius of curvature (mm) of groove bottom portion 6 (14) | | 7 | 10 | 10 | 8 | 10 | 10 | 5 | 5 |
| Radius of curvature (mm) of groove bottom portion 7 (15) | | 7 | 5 | 5 | 5 | 5 | 2 | 4 | 2 |
| Shoulder groove opening magnitude test (index) | | 100 | 105 | 95 | 91 | 90 | 102 | 103 | 104 |
| Wear energy at shoulder portion (index) | Free rotation | 100 | 102 | 96 | 85 | 90 | 98 | 93 | 92 |
| | +driving force | 100 | 102 | 95 | 92 | 94 | 95 | 93 | 93 |
| | +lateral force | 100 | 103 | 93 | 91 | 93 | 93 | 95 | 95 |
| | +camber angle | 100 | 104 | 94 | 93 | 95 | 93 | 93 | 93 |
| Vehicle fuel consumption test (index) | | 100 | 102 | 100 | 98 | 100 | 100 | 100 | 100 |
| Partial wear test (index) | | 100 | 103 | 99 | 93 | 102 | 99 | 98 | 98 |

It is understood from Table 1 that the results of Examples in the groove opening magnitude evaluation test, the partial wear test (indoor), the vehicle fuel consumption test, and the partial wear test (by actual vehicle) are better than those of Comparative Examples. Accordingly, it is understood that the tires of Examples suffer from less groove cracks and partial wear than the tires of Comp. Examples and that the tires of some Examples improve fuel consumption of a vehicle having the tires mounted thereon, as compared with the tires of Comp. Examples.

EXPLANATION OF NUMERAL REFERENCES

1 Bead portion
2 Sidewall portion
3 Tread portion
4 Carcass
5 Belt
6 Circumferential groove
7 Shoulder groove
8 Groove wall 9 Opening edge
10 Tangent line
11 Groove wall
12 Opening edge
13 Tangent line
14 Groove wall bottom portion
15 Groove wall bottom portion
16 Deepest portion of groove bottom
17 Midpoint between Opening edges
18 Normal line
19 Bead core
SW Width of shoulder rib
HW Tread half width
4th $4^{th}$ Rib

| Explanation of Numeral References | |
|---|---|
| 1 | Bead portion |
| 2 | Sidewall portion |
| 3 | Tread portion |
| 4 | Carcass |
| 5 | Belt |
| 6 | Circumferential groove |
| 7 | Shoulder groove |
| 8 | Groove wall |
| 9 | Opening edge |
| 10 | Tangent line |
| 11 | Groove wall |
| 12 | Opening edge |
| 13 | Tangent line |
| 14 | Groove wall bottom portion |
| 15 | Groove wall bottom portion |
| 16 | Deepest portion of groove bottom |
| 17 | Midpoint between Opening edges |
| 18 | Normal line |
| 19 | Bead core |
| SW | Width of shoulder rib |
| HW | Tread half width |
| 4th | $4^{th}$ Rib |

The invention claimed is:

1. A tire having in a tread surface thereof plural circumferential grooves extending in the tire circumferential direction, characterized in that:
each of respective circumferential grooves disposed on the outermost side in the tire widthwise direction, of the circumferential grooves, is designed to have a section in the tire widthwise direction in which an angle formed by a groove wall on the outer side in the tire widthwise direction, with respect to a straight line tangent to a tread contour at the opening edge on the outer side in the tire widthwise direction of said groove, is larger than an angle formed by a groove wall on the tire equatorial side in the tire widthwise direction, with respect to a straight line tangent to a tread contour at the opening edge on the tire equatorial side in the tire widthwise direction of said groove; and
each of said angles is in the range of 90° to 100° (inclusive of 90° and exclusive of 100°),
wherein the number of the circumferential grooves is eight;
a width of each land portion located on the outermost side in the tire widthwise direction, of land portions demarcated by said circumferential grooves and respective tread ends, is 20 to 40% of a half width of the tread; and
a width of each of respective land portions adjacent to the respective land portions located on the outermost side in the tire widthwise direction, on the inner side in the tire widthwise direction thereof, is 60 to 80% of the width of each of the land portions located on the outermost side in the tire widthwise direction.

2. The tire of claim 1, wherein each of the circumferential grooves disposed on the outermost side in the tire widthwise direction is designed to have a section in the tire widthwise direction, in which a radius of curvature at a groove wall bottom portion on the outer side in the tire widthwise direction is larger than a radius of curvature at a groove wall bottom portion on the tire equatorial side in the tire widthwise direction.

3. The tire of claim 1, wherein each of the circumferential grooves disposed on the outermost side in the tire widthwise direction is a straight groove.

4. The tire of claim 1, wherein the groove wall on the outer side in the tire widthwise direction, of each of the circumferential grooves disposed on the outermost side in the tire widthwise direction, is a flat or curved face without any zigzag configuration.

5. The tire of claim 1, wherein each of the circumferential grooves disposed on the outermost side in the tire widthwise direction has a sectional shape in the tire widthwise direction, which is monotonously unchanged in the tire circumferential direction.

* * * * *